(No Model.)

C. J. JONES.
PERFORATED PULLEY.

No. 440,040. Patented Nov. 4, 1890.

Witnesses
Sam¹ R. Turner.
Van Buren Hillyard.

Inventor
Clinton Joshua Jones.
By his Attorneys
R. S. & A. P. Lacey

UNITED STATES PATENT OFFICE.

CLINTON JOSHUA JONES, OF NEW PHILADELPHIA, OHIO.

PERFORATED PULLEY.

SPECIFICATION forming part of Letters Patent No. 440,040, dated November 4, 1890.

Application filed May 6, 1890. Serial No. 350,755. (No model.)

*To all whom it may concern:*

Be it known that I, CLINTON JOSHUA JONES, a citizen of the United States, residing at New Philadelphia, in the county of Tuscarawas and State of Ohio, have invented certain new and useful Improvements in Perforated Pulleys; and I do hereby declare the following to be a full, clear, and exact description of the invention, such as will enable others skilled in the art to which it appertains to make and use the same.

This invention relates to band-pulleys for dynamos and other high-speed machinery, and has for its object to increase the adhesion of the belt by permitting air that gathers or accumulates under the belt to escape through perforations in the rim of the said pulley, and also to create a partial vacuum which will cause the belt to be pressed on the said pulley by atmospheric pressure.

The improvement consists, essentially, in a hollow rim, the outer and inner shells being perforated to permit a free escape of the air, and which shells are connected at their edges and at points in their circumferential length, whereby compartments are formed and a partial vacuum is obtained.

The improvement further consists in the novel features and peculiar construction and combination of the parts, which will be hereinafter more fully described and claimed, and which are shown in the accompanying drawings, in which—

Figure 1:
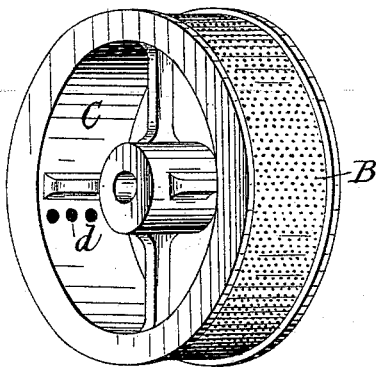
Figure 2:
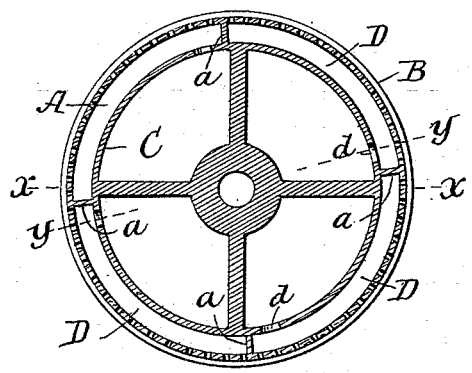
Figure 3:
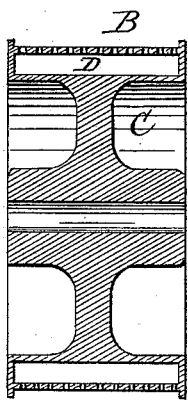
Figure 4:
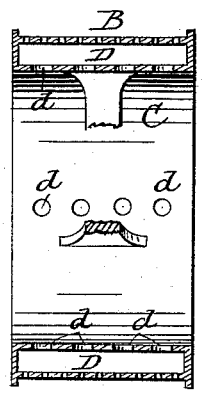

Figure 1 is a perspective view of a pulley embodying my invention. Fig. 2 is a central longitudinal section of the pulley. Fig. 3 is a cross-section on the line X X of Fig. 2. Fig. 4 is a cross-section on the line Y Y of Fig. 2.

The pulley is of usual construction, except that its rim is made hollow, being composed of an outer shell B and an inner shell C. The outer shell B is perforated, the perforations preferably covering the entire surface, although this is not essential to the effective operation of the pulley, as the said perforations may be formed in rows or at any desired intervals apart. The inner shell C is provided with perforations $d$, which extend in a row from one side of the pulley to the other. The space A between the two shells B and C is provided by the partitions $a$, so as to form a series of compartments D separate and independent of each other. The perforations $d$ are located, preferably, at the rear end of the said compartments D, to more effectively exhaust the air from the said compartments D by centrifugal action of the pulley, thereby creating a partial vacuum under the belt and causing it to adhere more closely to the pulley. These partitions $a$ also serve as braces between the two shells B and C and divide the strain between the two shells. The shells B and C may be separately formed and secured together in any desired manner; but in small pulleys it is preferred to cast them together. In large pulleys the parts may be cast in sections, which are bolted together in any desired manner. In practice as the pulley revolves at a high rate of speed the air which is usually caught between the pulley and belt passes through the perforations in the outer shell of the pulley and prevents cushioning of the belt and a slipping of the same on the pulley. Added to this, the centrifugal action sucks the air through the perforations $d$ and creates a partial vacuum under the belt, and causes the same to adhere more closely to the pulley by atmospherical pressure.

Having thus described my invention, what I claim, and desire to secure by Letters Patent, is—

1. A pulley having a hollow rim and having the outer and inner shells thereof perforated, substantially as and for the purpose described.

2. A pulley having a hollow rim and having the space between the two shells subdivided into separate compartments and having the outer and inner shells perforated, substantially as and for the purpose set forth.

3. A pulley having a hollow rim and having the space between the two shells subdivided into comparments and having the outer shell perforated and having the inner shell perforated at the rear end of the said compartments, substantially as and for the purpose specified.

4. The hereinbefore-specified cast-metal pulley having a hollow rim, partitions $a$ between the two shells of the rim, the outer shell being perforated and the inner shell having perforations close to the said partitions, substantially as set forth.

In testimony whereof I affix my signature in presence of two witnesses.

CLINTON JOSHUA JONES.

Witnesses:
 H. C. BAILEY,
 E. M. BAILEY.